No. 841,969. PATENTED JAN. 22, 1907.
J. HODGE.
CORN POPPER.
APPLICATION FILED MAY 22, 1906.
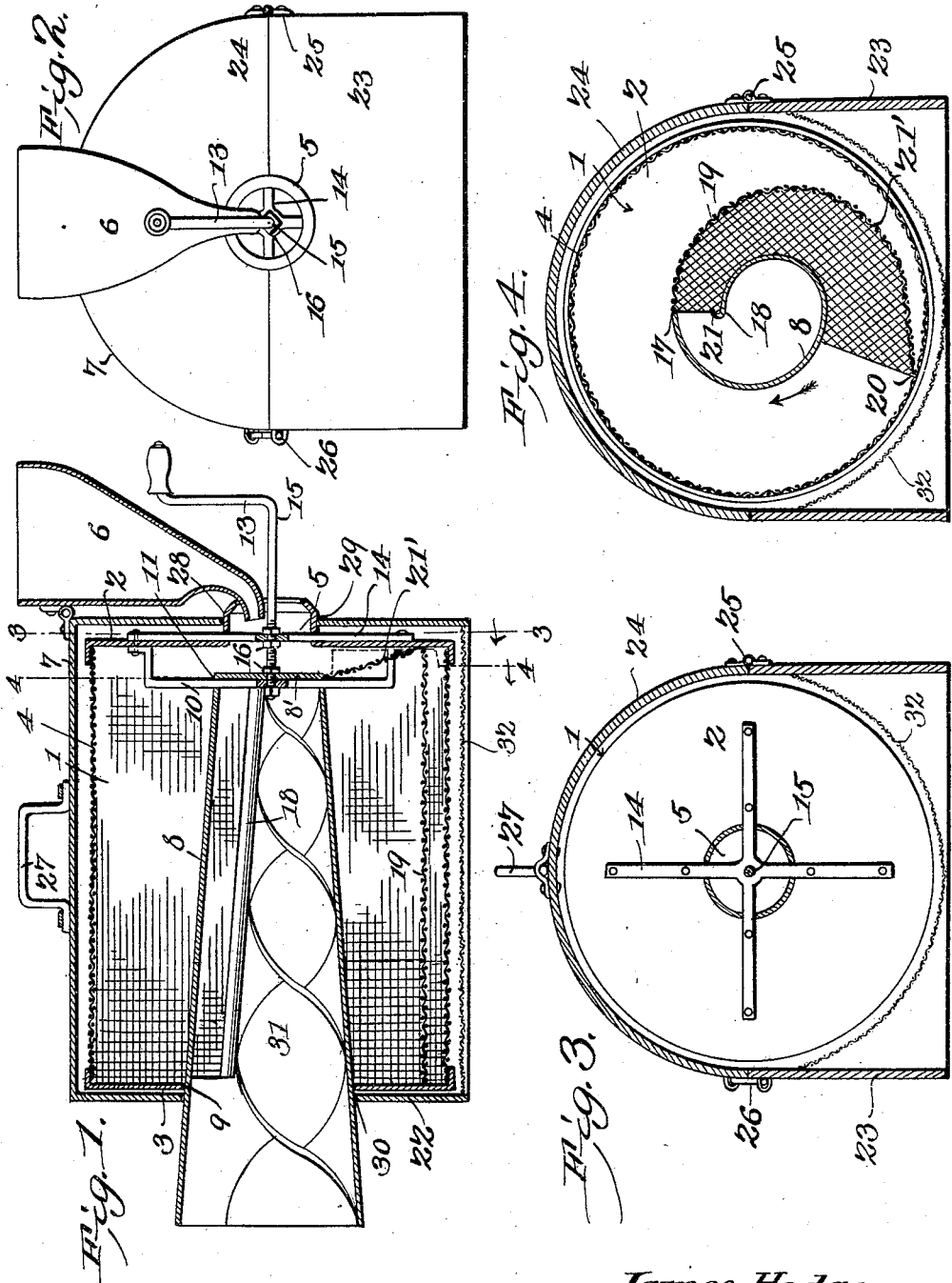
WITNESSES:
James Hodge,
INVENTOR
By C. A. Snow & Co.
ATTORNEYS.

UNITED STATES PATENT OFFICE.

JAMES HODGE, OF BERKELEY, CALIFORNIA.

CORN-POPPER.

No. 841,969. Specification of Letters Patent. Patented Jan. 22, 1907.

Application filed May 22, 1906. Serial No. 318,221.

*To all whom it may concern:*

Be it known that I, JAMES HODGE, a citizen of the United States, residing at Berkeley, in the county of Alameda and State of California, have invented a new and useful Corn-Popper, of which the following is a specification.

The present invention relates to a corn-popping machine in which the feed of the grains to be popped and the discharge of the popped corn can be maintained continuous without requiring the popper to be removed from the source of heat for charging and emptying the popper, as is necessary with machines in common use.

The objects of the invention are to provide a popper of this character which shall be of simple and durable construction, inexpensive to manufacture, and efficient in operation.

With these ends in view the invention comprises the various details of construction and arrangement of parts, to be more fully described hereinafter and set forth with particularity in the claims appended hereto.

In the accompanying drawings, which illustrate one embodiment of the invention, Figure 1 is a central longitudinal section of the popper. Fig. 2 is a view of the crank end thereof, and Figs. 3 and 4 are transverse sections taken respectively on lines 3 3 and 4 4 of Fig. 1.

Corresponding parts in the several figures are indicated throughout by similar characters of reference.

Referring to the drawings, 1 represents the popping drum or cylinder having tin or sheet metal heads 2 and 3 and a cylindrical wall 4, which may be made of tin or sheet metal with or without perforations or of wire-netting of suitable gage. The heads 2 and 3 are each flanged around the periphery, so as to receive the ends of the cylindrical screen-netting 4 and to which the ends of the latter are suitably secured. The front head 2 has a central opening 5 around the edges thereof. The head is expanded outwardly to form a mouth into which the discharge end of the hopper 6 extends. The hopper is supported stationary in proper relation to the mouth of the drum by any suitable means—as, for instance, the wall 7 of the inclosing casing.

Arranged centrally of the drum and extending with its axis parallel to the latter is a discharge-cone 8. The larger or discharge end of the cone extends beyond the rear head 3 on the popper-drum, the said end extending through an opening 9 in the rear head. The front end of the discharge-cone is located in suitable proximity to the front head 2, that sufficient clearance be provided between the end of the cone and the discharge end of the hopper, so that the grains of corn can pass freely into the drum without entering the discharge-cone. The front end of the discharge-cone may be and preferably is provided with a head 8', so as to prevent the corn from entering the same from the hopper. The rear end of the discharge-cone is supported by the opening 9 in the rear head 3, in which it is snugly fitted, while the front end is supported by a frame comprising two cross-arms 10, secured to and extending inwardly from the inner surface of the front head 2 of the drum. The front end of the discharge-cone is provided with four slots 11, which are spaced ninety degrees apart to receive the cross-arms 10.

The drum and discharge-cone are rotated by the crank 13, and the crank is connected to the drum by means of the cross-arms 14, secured to the head 2, and the cross-arms 10. At the point where the cross-arms cross each other they are provided with registering openings to receive the shaft 15, to which the crank-arm is attached. The shaft also extends through an opening in the head 8' and is rigidly connected to the cross-arms and said head by means of nuts 16. Obviously any other construction which is inexpensive and substantial may be employed for connecting the shaft to the drum and cone.

As shown in Fig. 4, the discharge-cone is spiral in transverse section, so that the adjacent edges 17 and 18 form a longitudinal mouth for receiving the popped corn. The spiral of the cone is made up of a single turn, and extending from the edge 17, substantially as a continuation of the spiral, is a screen or separating member 19, that is of suitable gage to permit the unpopped corn to pass through its meshes, but prevents the popped corn from passing therethrough. The outer edge 20 of the screen is connected to the inner surface of the drum. Along the inner edge 18 of the discharge-cone the metal is turned back on a reversed curve to form a longitudinal trough or retainer 21; that serves to collect the unpopped grains of corn that fail to pass through the screen 19 and drop off the same during the revolution of the popper. When the trough reaches a certain position in the revolution, the unpopped corn will fall out toward the bottom of the hopper, so that it will be further heated and popped, or fall through the screen 19 back into the drum. As shown in Fig. 1, the front end of the discharge-cone 8, and hence the front end of the longitudinal mouth thereof, is located somewhat to the rear of the front end or head 2 of the drum. In order then to deflect the top corn at the front end of the drum into the mouth of the discharge-cone, an inwardly-inclined deflector 21', Figs. 1 and 4, is provided that extends from the front edge of the screen 19 to the front end of the discharge-cone. This may be a portion of the screen 19 turned inwardly therefrom in the manner shown or it may be a separate member secured between the screen and the discharge-cone.

Surrounding the drum 1 and affording a suitable mounting therefor is the inclosing casing 22, made in two parts and divisible on the horizontal plane passing through the axis of rotation of the drum. These two parts 23 and 24 are hinged together at one side, as indicated at 25, and are locked together by a hook or other device 26 on the opposite side. The base-section 23 is preferably rectangular in shape and is open at its bottom, so that the popper can be placed over a flame or other suitable source of heat. The top section 24 is preferably semicylindrical and closely conforms to the cross-section of the drum. Provided on the top section is a handle or bail 27, whereby the hopper is easily carried. The drum is mounted in the inclosing casing by means of the outwardly-extending flanged portion 28 of the mouth 5, which forms one journal, and by means of the rear end of the discharge-cone. The front end of the inclosing casing 22 is provided with a central opening 29, that forms a journal-bearing for the journal or portion 28, while the rear end of the casing is provided with an opening 30, that forms a journal-bearing receiving the rear end of the discharge-cone. This end of the discharge-cone projects sufficiently to the rear of the casing so that a suitable receptacle can be placed thereunder to receive the popped corn.

In order to insure a quick feed of the popped corn through the discharge-cone, the latter is provided with a screw 31, as clearly shown in Fig. 1. This screw is preferably made of sheet metal and is shaped to conform to the cone, so that the same can be inserted into the cone from the enlarged end thereof and be frictionally held therein. The screw is hence removable, and the hopper can be used with or without the same, as desired. To prevent an intense flame from burning the corn, a fine gauze 32 is arranged under the drum, with its edges secured to the casing 23.

The operation is as follows: According to the disposition of the parts as illustrated in the present case the popper is adapted to be turned clockwise or in the direction indicated by the arrow in Fig. 4. The corn to be popped is fed to the popper through the hopper 6, and the crank 13 is next turned. The grains of corn roll along on the inner surface of the drum a number of times, passing freely through the screen 19 until they are sufficiently heated to pop. As the mixture of popped and unpopped corn again reaches its screen 19 the popped corn is separated thereby, while the unpopped grains pass freely through the screen and are subjected to further heat until they are finally popped. The popped corn that is separated by this screen rolls along the inner surface of the screen and enters the mouth of the discharge-cone. From the cone the popped corn gradually passes out of the open end thereof as the corn moves freely to the discharge end by reason of the outward expansion of the cone and the rotation of the latter. It will thus be seen that the popping operation can go on continuously without any of the unpopped grains of corn being discharged with that which is popped.

I have described the principle of operation of the invention, together with the apparatus which I now consider to be the best embodiment thereof; but I desire to have it understood that the apparatus shown is merely illustrative and that the invention can be carried out by other means.

Having thus described the invention, what is claimed is—

1. A corn-popper comprising a casing having central openings at its ends, a drum mounted in the casing and having a feed-mouth extending into one of the openings of the casing to form a journal for the drum, a hopper supported on the casing and arranged with its lower end extending into the mouth of the drum, a discharge-cone supported in the drum and extending outwardly therefrom through the opening of the casing opposite from that having the feed-mouth, cross-arms rigidly connected with the drum and cone, and a crank-shaft rigidly connected with the cross-arm and extending outwardly through the feed-mouth.

2. A corn-popper comprising a casing having an opening, a drum having a tubular central feed-mouth in its front head extending into the opening of the casing to form a journal, a hopper arranged to discharge into said mouth, a cone for discharging the popped corn which at one end is supported by the rear head of the drum, a frame supported on the interior of the drum at the front head thereof, means for connecting the front end of the cone with said frame, and a crank-shaft connected with said frame for rotating the drum and cone and located wholly exterior to the drum.

3. A corn-popper comprising a drum having a central mouth in its front head, a hopper arranged to discharge into said mouth, a discharge-cone supported at one end by the rear head of the drum and provided with slots in its front end, and cross-arms extending inwardly from the inner surface of the front head of the drum, and engaging in said slots, a crank-shaft, means for connecting the shaft to the arms, cross-arms secured to the front head of the drum which are independent of the first-mentioned cross-arms, and means for connecting the crank-shaft with the last-mentioned cross-arms.

4. A corn-popper comprising a drum, a discharge-cone axially mounted therein with its front end spaced apart from the adjacent end of the drum, a separating-screen extending between the cone and drum and disposed axially of the latter, and a deflector extending between the adjacent ends of the cone and drum for deflecting the popped corn into the former.

5. A corn-popper comprising a drum having a central mouth in its front head, a hopper arranged to discharge into said mouth, a cone for discharging the popped corn which has its front end spaced apart from the front head of the drum, and a screen extending between the drum and cone and provided with an inwardly-extending portion between the said head and front end of the cone for deflecting the popped corn into the latter.

6. A corn-popper comprising a drum provided with an opening at its front end, an outwardly-extending cylindrical member at said opening which forms a mouth and a journal, a discharge-cone in the drum which extends beyond the opposite end of the latter to form a journal, means for rotating the drum, and means for supporting the front end of the cone in the drum, in combination with an inclosing casing provided with openings which serve as journal-bearings for receiving the said cylindrical member and the projecting end of the discharge-cone.

In testimony that I claim the foregoing as my own I have hereto affixed my signature in the presence of two witnesses.

JAMES HODGE.

Witnesses:
J. J. BENTON,
C. H. McCOY.